United States Patent
Li et al.

(10) Patent No.: US 12,184,467 B2
(45) Date of Patent: *Dec. 31, 2024

(54) ARTIFICIAL INTELLIGENT ENHANCED DATA SAMPLING

(71) Applicant: HUAWEI TECHNOLOGIES CO., LTD., Guangdong (CN)

(72) Inventors: Ming Li, Cupertino, CA (US); Katherine Zhao, Mountain View, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,244

(22) Filed: Jul. 12, 2023

(65) Prior Publication Data

US 2023/0353440 A1 Nov. 2, 2023

Related U.S. Application Data

(63) Continuation of application No. 17/067,414, filed on Oct. 9, 2020, now Pat. No. 11,743,093, which is a (Continued)

(51) Int. Cl.
*H04L 27/26* (2006.01)
*H04L 43/022* (2022.01)
(Continued)

(52) U.S. Cl.
CPC ...... *H04L 27/2663* (2013.01); *H04L 27/2665* (2013.01); *H04L 43/024* (2013.01); (Continued)

(58) Field of Classification Search
CPC ... H04L 43/022; H04L 41/16; H04L 27/2665; H04L 43/024; H04L 49/205; H04L 67/10; H04L 27/2663; H04L 43/0864
See application file for complete search history.

(56) References Cited

U.S. PATENT DOCUMENTS 7,277,843 B1  10/2007 Wen et al.
11,360,873 B2 *  6/2022 Sakurai ............... G06F 11/3062
(Continued)

FOREIGN PATENT DOCUMENTS

CN  107133190 A  9/2017
CN  108541061 A  9/2018
(Continued)

OTHER PUBLICATIONS

Sheng, Y., et al., "Coarse—Grained Distributed Deep Learning for Personal Data Mining", vol. 5, No. 6, Nov. 2016, 6 pages.

*Primary Examiner* — Oussama Roudani
(74) *Attorney, Agent, or Firm* — Conley Rose, P.C

(57) ABSTRACT

Monitoring an operational characteristic of a data communication device within a network includes sampling an operational characteristic of the data communication device at a fine-grain sample rate over a first sampling interval to produce fine-grain samples of the operational characteristic of the data communication device, training a machine learning algorithm using the fine-grain samples of the operational characteristic of the data communication device, the fine-grain sample rate, and a coarse-grain sample rate that is less than the fine-grain sample rate, sampling the operational characteristic of the data communication device at the coarse-grain sample rate over a second sampling interval to produce coarse-grain samples of the operational characteristic of the data communication device, and using the machine learning algorithm to process the coarse-grain samples of the operational characteristic of the data communication device to produce accuracy-enhanced samples of the operational characteristic of the data communication device.

20 Claims, 12 Drawing Sheets

Related U.S. Application Data continuation of application No. PCT/CN2019/092873, filed on Jun. 26, 2019.

(60) Provisional application No. 62/811,285, filed on Feb. 27, 2019.

(51) Int. Cl.
  *H04L 43/024* (2022.01)
  *H04L 43/0864* (2022.01)
  *H04L 49/20* (2022.01)

(52) U.S. Cl.
  CPC ........ *H04L 43/0864* (2013.01); *H04L 49/205* (2013.01); *H04L 43/022* (2013.01)

(56) References Cited

U.S. PATENT DOCUMENTS

| | | | |
|---|---|---|---|
| 2013/0191107 A1* | 7/2013 | Tonouchi | G06F 11/3485 703/21 |
| 2015/0052090 A1 | 2/2015 | Lin et al. | |
| 2015/0236895 A1 | 8/2015 | Kay | |
| 2015/0244594 A1 | 8/2015 | Kay | |
| 2015/0244645 A1* | 8/2015 | Lindo | H04L 41/0896 709/224 |
| 2016/0344608 A1 | 11/2016 | Siemens et al. | |
| 2016/0374567 A1 | 12/2016 | Breslow et al. | |
| 2017/0027464 A1 | 2/2017 | Cole | |
| 2017/0053011 A1 | 2/2017 | Alatorre et al. | |
| 2017/0331752 A1 | 11/2017 | Jana et al. | |
| 2018/0255556 A1 | 9/2018 | Das et al. | |
| 2018/0285772 A1 | 10/2018 | Gopalan | |
| 2018/0365523 A1 | 12/2018 | Zhou | |
| 2020/0097772 A1* | 3/2020 | Nakanishi | G06F 18/217 |
| 2021/0027170 A1 | 1/2021 | Ye et al. | |
| 2021/0342683 A1* | 11/2021 | Baker | G06N 3/047 |
| 2023/0342607 A1* | 10/2023 | Zhou | G06N 3/08 |

FOREIGN PATENT DOCUMENTS

| | | |
|---|---|---|
| CN | 108632963 A | 10/2018 |
| CN | 109347668 A | 2/2019 |
| EP | 3282252 A1 | 2/2018 |

* cited by examiner

ARTIFICIAL INTELLIGENT ENHANCED DATA SAMPLING

CROSS REFERENCE TO RELATED APPLICATION

The present application is a continuation of U.S. patent application Ser. No. 17/067,414 filed on Oct. 9, 2020, which is a continuation of International Patent Application No. PCT/CN2019/092873 filed on Jun. 26, 2019, by Huawei Technologies Co., Ltd., and titled "Artificial intelligent enhanced data sampling," which claims the benefit of U.S. Provisional Patent Application No. 62/811,285 filed on Feb. 27, 2019 by Ming Li, et al., and titled "Artificial Intelligent Enhanced Data Sampling," which are hereby incorporated by reference.

TECHNICAL FIELD

The present application relates to communication technology, and more particularly to the sampling of data in a communication network.

BACKGROUND

Communication systems are known to support wireless and wire lined communications between wireless and/or wire lined communication devices. Such communication systems include a vast number of interconnected networks that support communications among and between billions of devices, such networks including the Internet, the World Wide Web (WWW), wide area networks, local area networks, cellular networks, short range wireless networks, etc.

The Internet of Things (IoT) has grown to greatly increase the number of devices for which communications are supported. The IoT often includes data source communication devices that collect data, and which are sampled by data collection communication devices. Use cases of such data collection include big data collection, telemetry, security, body monitoring, and many other applications. The management of a communication network is dependent upon knowing the statuses of network devices. In order to manage these network devices, their statuses, e.g., buffer fill, latency, and other characteristics, must be periodically sampled. Many other systems depend upon the sampling of operational characteristics of communication devices.

It is difficult to determine exactly the sampling rate in which a communication device should be sampled. Thus, sampling rates are typically chosen to ensure data is sampled at a relatively high rate. Typical sampling rates may be in sub-milliseconds, which is too frequent, but which yields accurate samples. High sampling rates not only cause increased and unneeded network traffic but overload the communication and processing resources of both the data source communication and the data collection communication device.

SUMMARY

The present disclosure describes an Artificial Intelligence solution that reduces sampling rates and still achieves or approaches sampling results that are obtained using high-speed data sampling. Multiple embodiments are described herein that accomplish the objectives of the disclosure. A first embodiment discloses a method for monitoring an operational characteristic of a data communication device within a network includes sampling an operational characteristic of a data communication device at a fine-grain sample rate over a first sampling interval to produce fine-grain samples of the operational characteristic of the data communication device. Next, the first embodiment includes training a machine learning algorithm using the fine-grain samples of the operational characteristic of the data communication device, the fine-grain sample rate, and a coarse-grain sample rate that is less than the fine-grain sample rate. The first embodiment continues with sampling the operational characteristic of the data communication device at the coarse-grain sample rate over a second sampling interval to produce coarse-grain samples of the operational characteristic of the data communication device. Finally, the first embodiment includes using the machine learning algorithm to process the coarse-grain samples of the operational characteristic of the data communication device to produce accuracy-enhanced samples of the operational characteristic of the data communication device.

The first embodiment and the remaining embodiments described herein provide important benefits as compared to prior solutions. In particular, sampling according to the first embodiment provides accurate samples of the operational characteristic of the data communication device at the coarse-grain sample rate, reducing network traffic and network processing requirements.

The first embodiment includes a variety of optional aspects. According to a first optional aspect, the operational characteristic of the data communication device includes a round-trip communication interval between a data collection communication device and the data communication device. According to a second optional aspect, the operational characteristic of the data communication device includes an average free buffer level of the data communication device. According to a third optional aspect, the operational characteristic of the data communication device includes at least one health related parameter. According to a fourth optional aspect, the operational characteristic of the data communication device includes at least one network state parameter. According to a fifth optional aspect, the operational characteristic of the data communication device includes at least one network latency parameter.

According to a sixth optional aspect, the method includes determining, by the machine learning algorithm based upon the fine-grain samples, a data collection sampling rate and retrieving data from the data communication device by a data collection communication device at the data collection sampling rate.

According to a seventh optional aspect, the method includes sampling the operational characteristic of the data communication device at the fine-grain sample rate over a third sampling interval to produce second fine-grain samples of the operational characteristic of the data communication device and retraining the machine learning algorithm using the second fine-grain samples of the operational characteristic of the data communication device of the operational characteristic of the data communication device.

A second embodiment of the present disclosure is directed to a communication device having processing circuitry, memory, and communications circuitry. With the second embodiment, the components of the communication device are configured to sample an operational characteristic of a data communication device at a fine-grain sample rate over a first sampling interval to produce fine-grain samples of the operational characteristic of the data communication device, train a machine learning algorithm using the fine-grain samples of the operational characteristic of the data communication device, the fine-grain sample rate, and a coarse-grain sample rate that is less than the fine-grain sample rate, sample the operational characteristic of the data communication device at the coarse-grain sample rate over a second sampling interval to produce coarse-grain samples of the operational characteristic of the data communication device, and use the machine learning algorithm to process the coarse-grain samples of the operational characteristic of the data communication device to produce accuracy-enhanced samples of the operational characteristic of the data communication device.

The first embodiment includes a variety of optional aspects. According to a first optional aspect, the operational characteristic of the data communication device includes a round-trip communication interval between a data collection communication device and the data communication device. According to a second optional aspect, the operational characteristic of the data communication device includes an average free buffer level of the data communication device. According to a third optional aspect, the operational characteristic of the data communication device includes at least one health related parameter. According to a fourth optional aspect, the operational characteristic of the data communication device includes at least one network state parameter. According to a fifth optional aspect, the operational characteristic of the data communication device includes at least one network latency parameter.

According to a sixth optional aspect, the communication device is further configured to determine, by the machine learning algorithm based upon the fine-grain samples, a data collection sampling rate and cause retrieval of data from the data communication device by a data collection communication device at the data collection sampling rate.

According to a seventh optional aspect, the communication device is further configured to sample the operational characteristic of the data communication device at the fine-grain sample rate over a third sampling interval to produce second fine-grain samples of the operational characteristic of the data communication device and retrain the machine learning algorithm using the second fine-grain samples of the operational characteristic of the data communication device of the operational characteristic of the data communication device.

A third embodiment of the present disclosure is addressed to a method for monitoring an operational characteristic of a data communication device within a network. The method includes sampling an operational characteristic of a data communication device at a fine-grain sample rate over a first sampling interval by a first network device to produce fine-grain samples of the operational characteristic of the data communication device. The method further includes training a machine learning algorithm using the fine-grain samples of the operational characteristic of the data communication device, the fine-grain sample rate, and a coarse-grain sample rate that is less than the fine-grain sample rate by a second network device. The method further includes sampling the operational characteristic of the data communication device at the coarse-grain sample rate over a second sampling interval by the first network device to produce coarse-grain samples of the operational characteristic of the data communication device. The method concludes with using the machine learning algorithm to process the coarse-grain samples of the operational characteristic of the data communication device to produce accuracy-enhanced samples of the operational characteristic of the data communication device.

With a first optional aspect of the third embodiment, the operational characteristic of the data communication device includes at least one of a round-trip communication interval between a data collection communication device and the data communication device, an average free buffer level of the data communication device, at least one health related parameter, at least one network state parameter, or at least one network latency parameter.

With a second optional aspect of the third embodiment, the method further includes determining, by the machine learning algorithm based upon the fine-grain samples, a data collection sampling rate and retrieving data from the data communication device by a data collection communication device at the data collection sampling rate.

With a third optional aspect of the third embodiment, the method includes sampling the operational characteristic of the data communication device at the fine-grain sample rate over a third sampling interval by the first network device to produce second fine-grain samples of the operational characteristic of the data communication device and retraining the machine learning algorithm using the second fine-grain samples by the second network device.

The second and third embodiments provide benefits same/similar to those of the first embodiment. The first, second and third embodiments achieve or approach sampling results that are obtained using high-speed data sampling using a reduced sampling-rate at no-cost. With any of these embodiments, sampling the operational characteristic (e.g. the number of free buffers in our example) may require the sampling of additional features (e.g. the traffic volume in the last sampling period). Inputting the operational characteristic at the reduced sampling rate and these additional features into the machine model during training results in the accuracy-enhanced samples.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
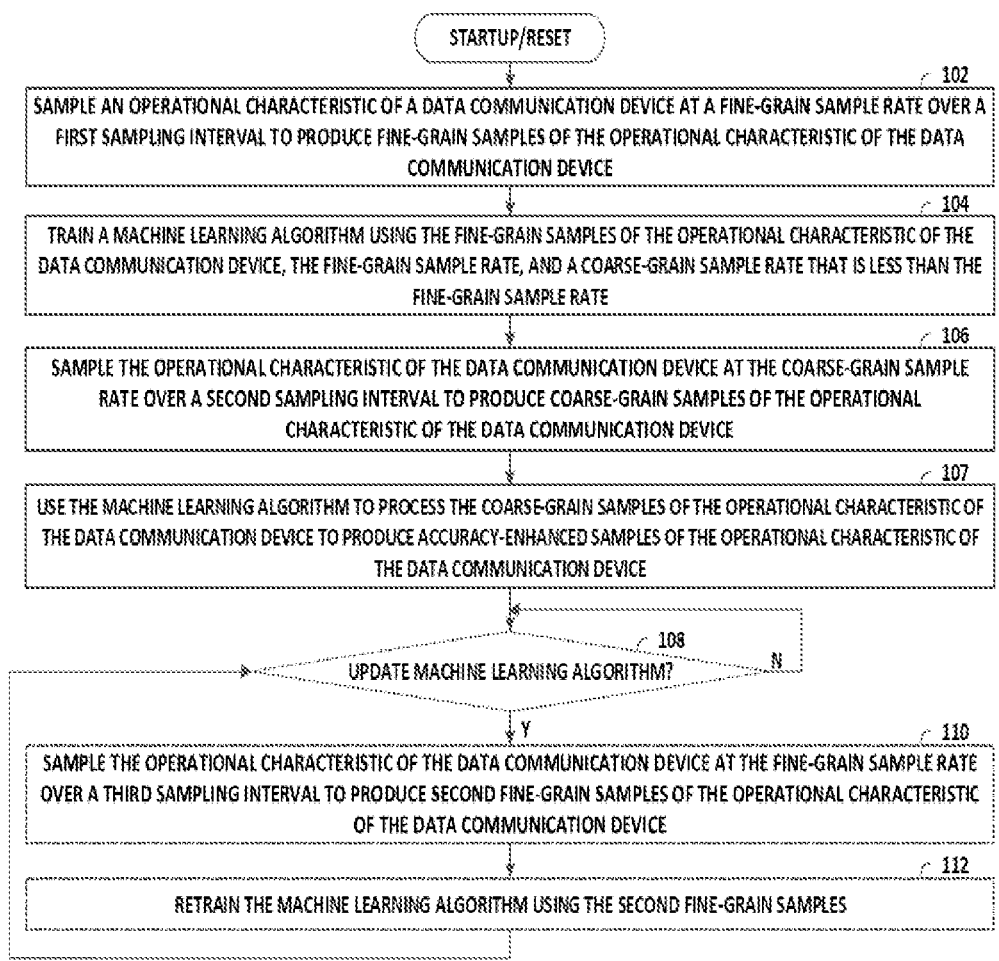
FIG. 1 is a flow chart illustrating operations according to a described embodiment of the present disclosure.

FIG. 1 is a flow chart illustrating operations according to a described embodiment of the present disclosure. Operations 100 for monitoring an operational characteristic of a data communication device within a network includes sampling an operational characteristic of a data communication device at a fine-grain sample rate over a first sampling interval to produce fine-grain samples of the operational characteristic of the data communication device (step 102). The operations 100 continue with training a machine learning (ML) algorithm using the fine-grain samples of the operational characteristic of the data communication device, the fine-grain sample rate, and a coarse-grain sample rate that is less than the fine-grain sample rate (step 104). The method continues with sampling the operational characteristic of the data communication device at the coarse-grain sample rate over a second sampling interval to produce coarse-grain samples of the operational characteristic of the data communication device (step 106). Operations 100 conclude with using the machine learning algorithm to process the coarse-grain samples of the operational characteristic of the data communication device to produce accuracy-enhanced samples of the operational characteristic of the data communication device (step 107).

The operations 100 include several optional steps, starting with determining whether to update the machine learning algorithm (step 108). A NO decision causes operations to remain at step 108. For a YES decision, operations 100 proceed with sampling the operational characteristic of the data communication device at the fine-grain sample rate over a third sampling interval to produce second fine-grain samples of the operational characteristic of the data communication device (step 110). Then, the operations 100 include retraining the machine learning algorithm using the second fine-grain samples (step 112). Operation returns to step 108 from step 112.

The operations 100 of FIG. 1 may be used for various operations. With a first operation, the operational characteristic of the data communication device includes a round-trip communication interval between a data collection communication device and the data communication device. With a second operation, the operational characteristic of the data communication device includes an average free buffer level of the data communication device. With a third operation, the operational characteristic of the data communication device includes at least one health related parameter. With a fourth operation, the operational characteristic of the data communication device includes at least one network state parameter. With a fifth operation, the operational characteristic of the data communication device includes at least one network latency parameter.

The operations 100 of FIG. 1 may include additional optional operations, including, determining, by the machine learning algorithm based upon the fine-grain samples, a data collection sampling rate and retrieving data from the data communication device by a data collection communication device at the data collection sampling rate. The machine learning employed, may be supervised learning, unsupervised learning, semi-supervised learning, reinforcement learning, an algorithm used, e.g., Q-Learning, Temporal Difference (TD), or Deep Adversarial Networks, for example. Other machine learning algorithms that may be employed include Linear Regression, Logistic Regression, Decision Trees, Support Vector Machine (SVM), Naive Bayes, k-nearest neighbors (kNN), K-Means, Random Forest or Dimensionality Reduction Algorithms such as Gradient Boosting machine (GBM) algorithms, XGBoost, LightGBM or CatBoost, for example. In one particular embodiment, the Random Forests Algorithm is used. Of course, the employed machine learning algorithms depend upon the operational characteristic of interest. For example, a first machine learning algorithm may be employed to sample health data while a differing machine learning algorithm may be selected for network traffic data.

Figure 2:
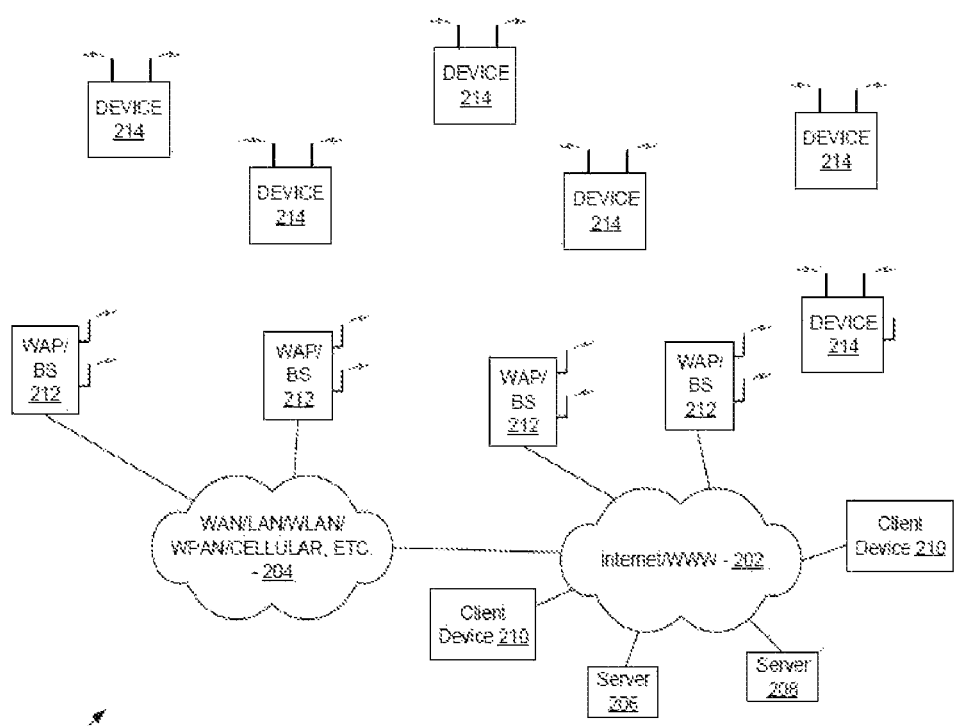
FIG. 2 is a system diagram illustrating a first communication network constructed and operating according to a described embodiment of the present disclosure.

FIG. 2 is a system diagram illustrating a communication network constructed and operating according to a described embodiment of the present disclosure. The wireless communication system 200 includes a plurality of communication networks 204 that couple to the Internet/WWW 202 to service voice and data communications. Coupled to the Internet/WWW 202 are servers 206 and 208 and at least one client device 210. The plurality of communication networks 204 includes one or more of a Wide Area Network (WAN), a Local Area Network (LAN), a Wireless Local Area Network (WLAN), a Wireless Personal Area Network (WPAN), a cellular network, and may include various other types of networks as well.

The plurality of communication networks 204 service one or more Wireless Access Points (WAPs) or base stations 212 that provide wireless service within respective service areas. WAPs 212 provide wireless access service in respective service areas within servicing frequency bands, e.g., 2.4 Gigahertz (GHz), 5 GHZ, 60 GHZ, etc., and support standardized (or proprietary) operating standards, e.g., IEEE 802.11x, Bluetooth, or other operating standards. Base stations, generally, provide wireless access service in respective service areas within respective frequency bands according to one or more cellular communication standards, e.g., Global System of Mobile Communication (GSM), Long-Term Evolution (LTE), xLTE, etc. In any case, these WAPs 212 provide voice and data service to a plurality of wireless devices 214, which will be described further herein. Some of these WAPs 212 may provide a combination of cellular, Wireless Wide Area Network (WWAN), Wireless Local Area Network (WLAN), and Wireless Personal Area Network (WPAN) service.

Wireless devices 214 service wireless communications with the WAPs 212 and/or directly with one another. These wireless devices 214 may be found in various contexts, including the home, business, public spaces, and automobile. These wireless devices 214 may be cell phones, wrist monitors, smart watches, watch phones, tablet computers, point-of-sale (POS) devices, readers, laptop computers, desktop computers, video games, automobiles, media players, digital cameras, smart phones, musical instruments, microphones, climate control systems, intrusion alarms, audio/video surveillance or security equipment, network attached storage, pet tracking collars, or other devices. As additional examples, the wireless devices 214 may further include audio head ends or digital video disc (DVD) players, satellite music transceivers, noise cancellation systems, voice recognition systems, navigation systems, alarm systems, engine computer systems, set top boxes, remote controls, or other devices.

One or more components of the wireless communication system 200 of FIG. 2 are configured to execute the operations 100 illustrated in FIG. 1. In some embodiments, a single network component, e.g., server 206 monitors the operations of a wireless device 214 to determine characteristics of the wireless device 214 such as a round-trip communication interval between a data collection communication device and the wireless device 214, an average free buffer level of the wireless device 214, at least one health related parameter produced by the wireless device 214, e.g., heartbeat, blood pressure, oxygen saturation, etc., at least one network state parameter, and at least one network latency parameter to name a few examples using the operations 100 of FIG. 1. In another operation, the operations 100 of FIG. 1 are divided between multiple network components of FIG. 2, e.g., with a first network component taking fine-grain samples, a second network components training a machine learning model, and the first network component taking the coarse-grain samples and using the machine learning algorithm to process the coarse-grain samples to produce accuracy-enhanced samples of the operational characteristic of the data communication device.

Figure 3:
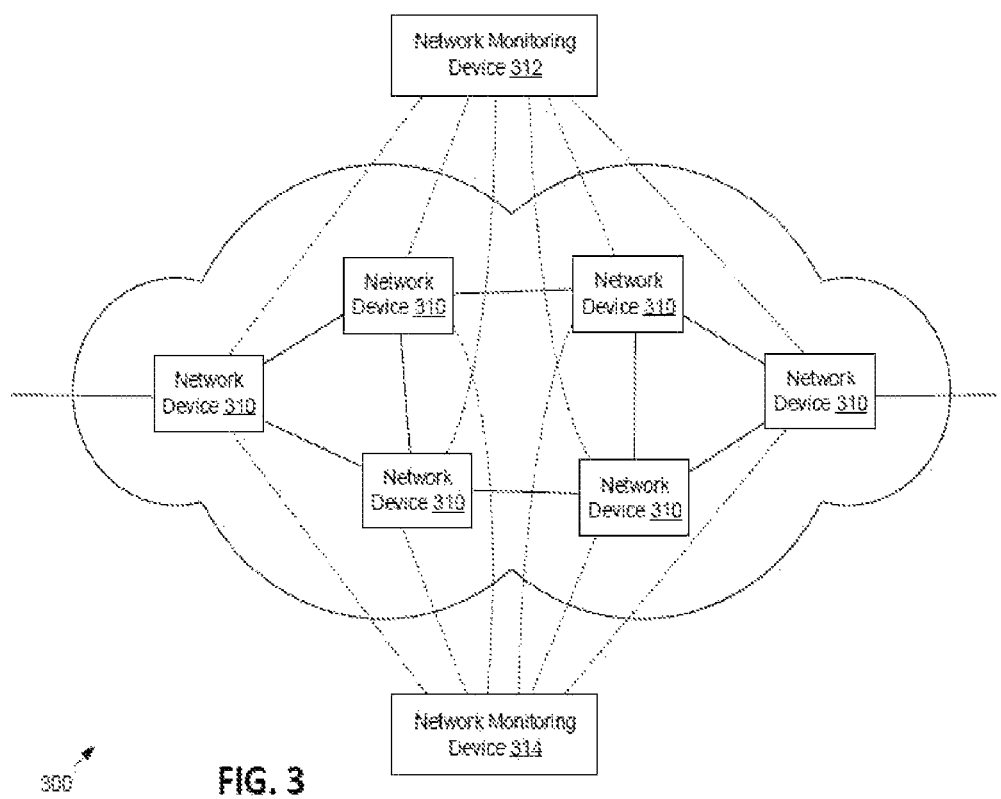
FIG. 3 is a system diagram illustrating a second communication network constructed and operating according to a described embodiment of the present disclosure.

FIG. 3 is a system diagram illustrating a second communication network constructed and operating according to a described embodiment of the present disclosure. The communication network 300 of FIG. 3 may be a network infrastructure that services the WWW or the Internet, a back-haul communication network for a cellular service provider, or another type of network infrastructure. The communication network 300 includes a plurality of network devices 310 that service the flow of data within the communication network 300. Of interest within the communication network are buffer availability of the network devices, latency of transmissions between network devices 310, and various other operational characteristics of the components of the communication network. This information, once obtained, may be used to adjust operation of the communication network 300, alter routing of data within the communication network 300, and/or to otherwise manage the communication network 300.

Thus, according to the present disclosure, one or more network monitoring devices 312 and/or 314 execute the operations 100 of FIG. 1 to monitor operational characteristics of the network devices 310 of the communication network. These operational characteristics of the network devices 310 may include round-trip communication interval times, average free buffer levels of the network devices 310, at least one network state parameter of one or more of the data communication devices, or at least one network latency parameter, for example.

Figure 4:
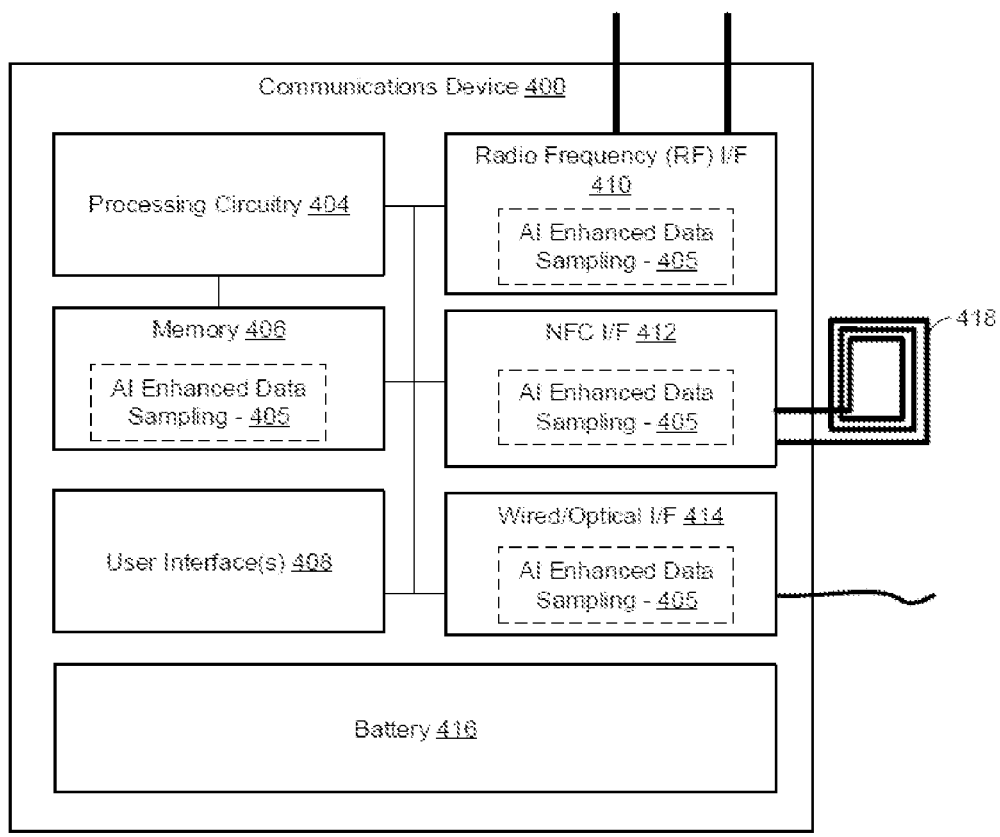
FIG. 4 is a block diagram illustrating a communications device constructed according to the present disclosure.

FIG. 4 is a block diagram illustrating a communications device 400 constructed according to the present disclosure. The communications device 400 includes processing circuitry 404, memory 406, one or more user interfaces 408, a Radio Frequency (RF) interface 410, a Near Field Communications (NFC) interface 412, a wired/optical interface 414, and a battery 416. The communications device 400 may be one of the WAPs 212 illustrated in FIG. 2, one of the servers 206 or 208 of FIG. 2, and/or one of the network monitoring devices 312 or 314 of FIG. 3.

The processing circuitry 404 may be one or more of a microprocessor, a digital signal processor, application specific processing circuitry, and/or other circuitry capable of executing logic operations based upon pre-programmed instructions or the execution of software instructions. The memory 406 may be dynamic random-access memory (RAM), static RAM, flash RAM, read-only memory (ROM), an electrically erasable programmable ROM (EEPROM), programmable ROM, magnetic storage, optical storage or other storage that is capable of storing instructions and data. The stored data may be NFC antenna tuning data, audio data, video data, user data, software instructions, configuration data, or other data. The user interface 408 supports one or more of a video monitor, a keyboard, an audio interface, or other user interface device.

The RF interface 410 supports one or more of cellular communications, WLAN communications, WPAN communications, WWAN communications, 60 GHz millimeter wave (MMW) communications, NFC communications, and/or other wireless communications. These wireless communications are standardized in most embodiments and proprietary in other embodiments. The NFC interface 412 couples to NFC antenna 418 and supports NFC communications as will be further described herein. The wired/optical interface 414 supports wired communications, which may be LAN communications, WAN communications, cable network communications, direct data link communications, or other wired communications and/or supports optical communications, which are standardized in some embodiments and proprietary in other embodiments.

Multiple of the components 404, 406, 408, 410, 412, and 414 of the communications device 400 may be constructed on a single integrated circuit die. It is fairly common to form all communication components, e.g., RF interface 410, NFC interface 412, and wired/optical interface 414 on a single integrated circuit. In some cases, even the antennas supporting the RF interface 410 may be formed on a single integrated circuit. In other cases, some or all of the components of the communications device 400 may be formed on a Printed Circuit Board (PCB).

According to an embodiment of the present disclosure, the communications device 400 includes Artificial Intelligence (AI) enhanced data sampling 405 structure and/or operations, also referred to as machine learning operations. Generally, the processing circuitry 404, the memory 406, and the communications circuitry 410/412/414 are configured to sample an operational characteristic of a data communication device at a fine-grain sample rate over a first sampling interval to produce fine-grain samples of the operational characteristic of the data communication device and train a machine learning algorithm using the fine-grain samples of the operational characteristic of the data communication device, the fine-grain sample rate, and a coarse-grain sample rate that is less than the fine-grain sample rate. The processing circuitry 404, the memory 406, and the communications circuitry 410/412/414 are further configured to sample the operational characteristic of the data communication device at the coarse-grain sample rate over a second sampling interval to produce coarse-grain samples of the operational characteristic of the data communication device and use the machine learning algorithm to process the coarse-grain samples of the operational characteristic of the data communication device to produce accuracy-enhanced samples of the operational characteristic of the data communication device.

The operational characteristic of the data communication device may include a round-trip communication interval between a data collection communication device and the data communication device, an average free buffer level of the data communication device, at least one health related parameter, at least one network state parameter, or at least one network latency parameter, for example.

Further, the processing circuitry 404, the memory 406, and the communications circuitry 410/412/414 may be further configured to determine, using the machine learning algorithm based upon the fine-grain samples, a data collection sampling rate and direct a data collection device to use the data collection sampling rate to sample data from the data communication device.

The processing circuitry 404, the memory 406, and the communications circuitry 410/412/414 may be further configured to sample the operational characteristic of the data communication device data at the fine-grain sample rate over a third sampling interval to produce second fine-grain samples of the operational characteristic of the data communication device and to retrain the machine learning algorithm using the second fine-grain samples.

Figure 5A:
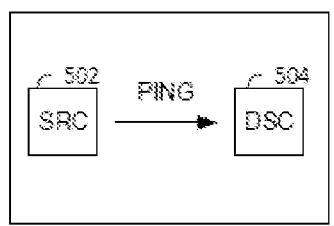
FIG. 5A is a diagram illustrating sampling to determine Round Trip Time (RTT) of telemetry according to the present disclosure.

FIG. 5A is a diagram illustrating sampling to determine Round Trip Time (RTT) of telemetry according to the present disclosure. In many wireless and/or wired applications, a source device (SRC) 502 is paired with a destination device (DSC) 504 for exchange of data. In a telemetry installation, for example, many sensors are communicatively intercoupled with one or more controllers. By determining the RTT between the SRC 502 and the DSC 504 using pinging, for example, the operation of the SRC 502 and DSC 504 may be controlled or further altered to reduce network resources usage and to conserve energy. The operations 100 of FIG. 1 and/or the structure 400 of FIG. 4 may be employed to determine RTT between the SRC 502 and DSC 504.

Figure 5B:
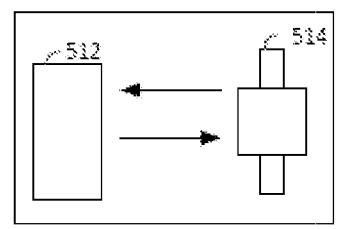
FIG. 5B is a diagram illustrating a paired phone and wristband constructed and operating according to the present disclosure.

FIG. 5B is a diagram illustrating a paired phone 512 and wristband 514 constructed and operating according to the present disclosure. A heartbeat measurement, a blood pressure measurement, or a blood oxygen concentration are examples of health-related parameters exchanged between the paired phone 512 and wristband 514 of FIG. 5B. In such case, the heartbeat monitoring wristband calculates the health-related parameter of a user on a periodic basis. The health-related parameter should only be sampled when available to avoid the wasted efforts of sampling to frequently. Thus, according to the present disclosure, with the operations 100 of FIG. 1 and/or the structure of FIG. 4, an accurate sampling interval is determined that may be used to efficiently sample the health-related parameter(s). Valuable communication resources and battery life are preserved with the data prepared by the wristband 514 only being sampled when the data is available.

Figure 5C:
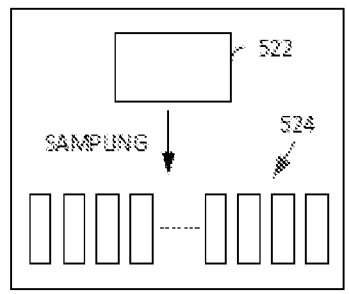
FIG. 5C is a diagram illustrating buffer sampling according to the present disclosure.

FIG. 5C is a diagram illustrating buffer sampling according to the present disclosure. With the example of FIG. 5C, telemetry data 524 is buffered continuously even though relevant data is contained within some of the available buffers. Sampling 522 should therefore be performed only when relevant data is available. Thus, it is advantageous to only sample the buffers containing relevant data. Thus, according to the present disclosure, with the operations 100 of FIG. 1 and/or the structure of FIG. 4, an accurate sampling interval is determined that may be used to efficiently sample the telemetry data 524. Valuable communication resources and battery life are preserved with the telemetry data 524 only being sampled when the data is available.

Figure 6A:
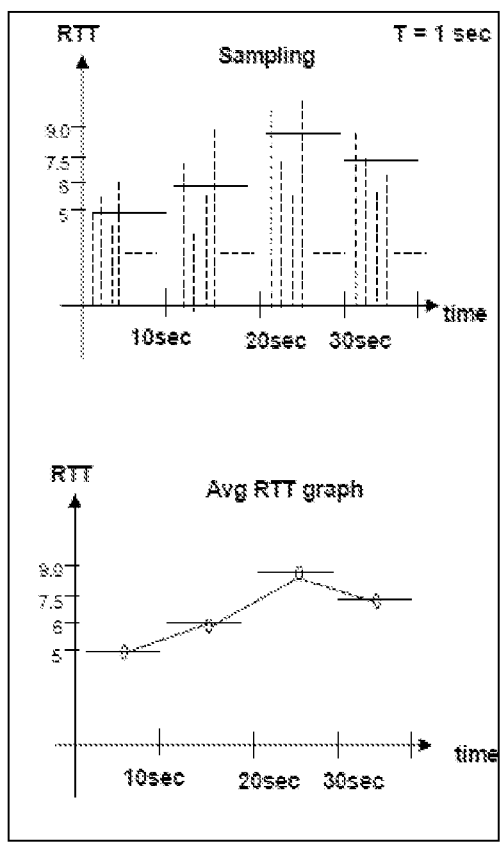
FIG. 6A is a diagram illustrating the use of fine-grain sampling to determine average RTT between communication devices.

FIG. 6A is a diagram illustrating the use of fine-grain sampling to determine average RTT between communication devices. As shown, the fine-grain sampling is performed with a fine-grain sample rate of once every second to produce fine-grain samples of the operational characteristic of a data communication device. Based upon this sampling time, average RTTs are determined for the fine-grain first sampling interval.

Figure 6B:
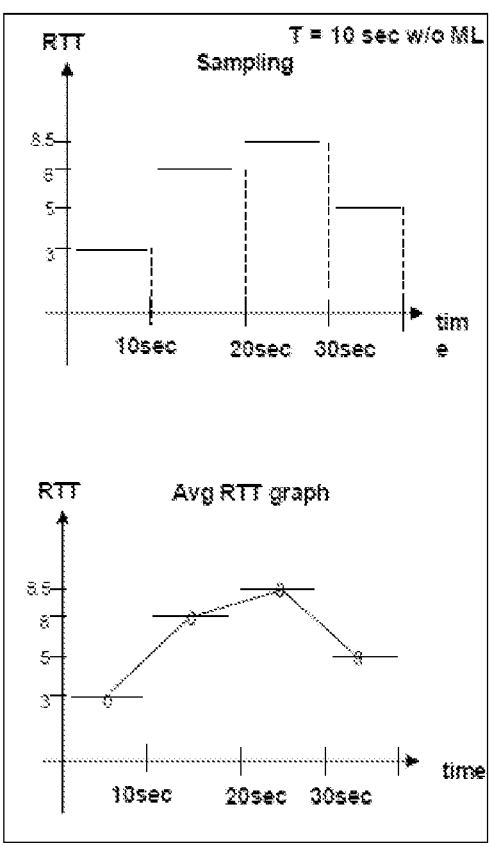
FIG. 6B is a diagram illustrating the use of coarse-grain sampling without machine learning to determine average RTT between communication devices.

FIG. 6B is a diagram illustrating the use of coarse-grain sampling without machine learning to determine average RTT between communication devices. As is shown, the use of coarse-grain sampling of 10 second intervals produce differing average RTTs as compared to the fine-grain sampling of FIG. 1. This result is problematic in that inaccurate data is returned.

Figure 6C:
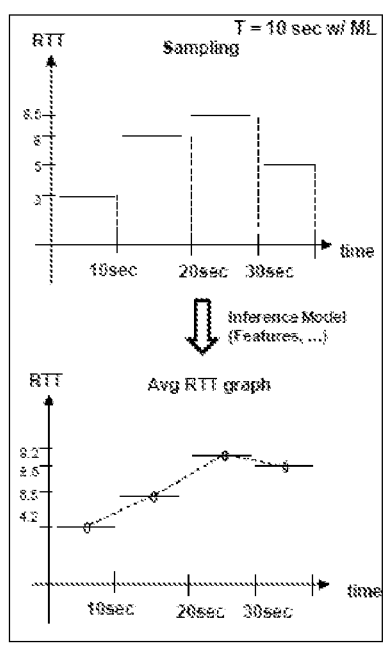
FIG. 6C is a diagram illustrating the use of coarse-grain sampling with machine learning to determine average RTT between communication devices.

FIG. 6C is a diagram illustrating the use of coarse-grain sampling with machine learning to determine average RTT between communication devices. The coarse-grain sampling that is done with the assistance of machine of FIG. 6C is done in accordance with the operations 100 of FIG. 1 and/or the structure of FIG. 4 and provides average RTTs that are more like the fine-grain sampling average RTTs (of FIG. 6A) than they are to the coarse-grain sampling average RTTs (of FIG. 6B).

Figure 6D:
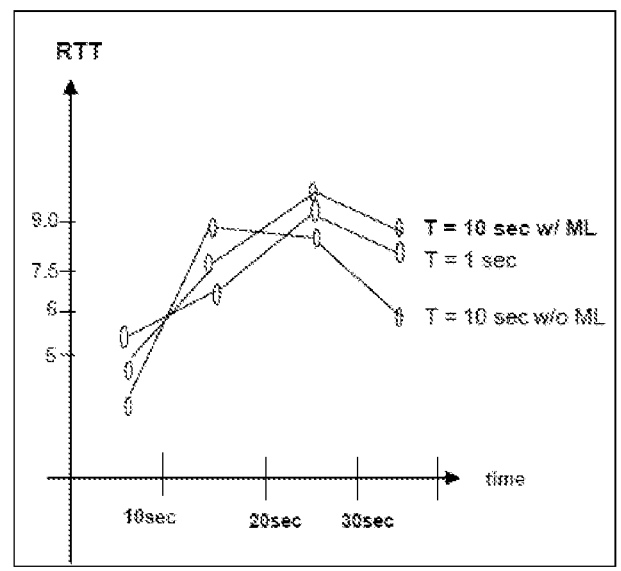
FIG. 6D is a graph illustrating RTT that was determined based upon the techniques of FIGS. 6A, 6B, and 6C.

FIG. 6D is a graph illustrating RTT that was determined based upon the techniques of FIGS. 6A, 6B, and 6C. Note that the average RTTs determined using coarse-sampling with ML (of FIG. 6C) more closely approximates the average RTTs determined using fine-sampling (of FIG. 6A) than the RTTs using coarse-grain sampling (of FIG. 6B).

Figure 7:
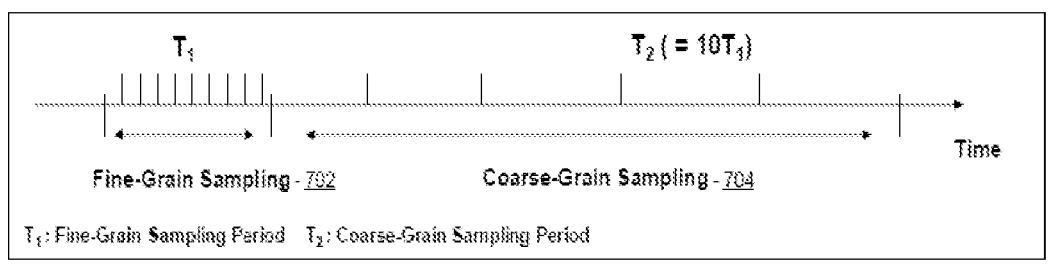
FIG. 7 is a diagram illustrating Two-Stage sampling and machine learning according to a described embodiment of the present disclosure.

FIG. 7 is a diagram illustrating Two-Stage sampling and machine learning according to a described embodiment of the present disclosure. As shown in FIG. 7, data sampling 700 is divided into the two stages: (1) fine-grain sampling at a fine-grain sample rate over a first sampling interval 702 to produce fine-grain samples of the operational characteristic of the data communication device followed by ML training using the fine-grain samples and then (2) coarse-grain sampling over a second sampling interval 704 using ML inference over a second sampling interval to produce accuracy-enhanced coarse-grain samples of the operational characteristic of the data communication device. With the example of FIG. 7, the fine-grain sampling period is one-tenth of the coarse-grain sampling period, corresponding to the fine-grain sample rate being ten times the coarse-grain sample rate.

Figure 8:
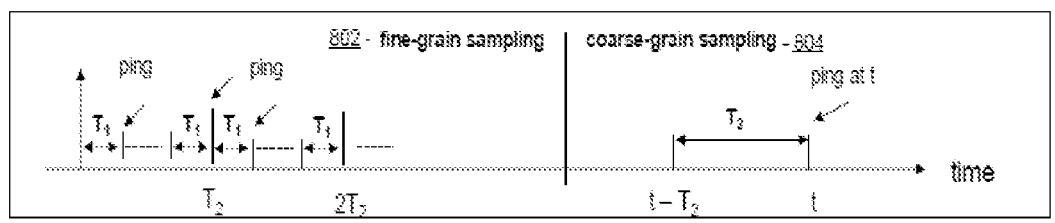
FIG. 8 is a diagram illustrating alternate Two-Stage sampling and machine learning according to another described embodiment of the present disclosure.

FIG. 8 is a diagram illustrating alternate Two-Stage sampling and machine learning according to another described embodiment of the present disclosure. Particularly, with the example 800 of FIG. 8, a data communication device is pinged using fine-grain sampling over a first sampling interval 802 according to a fine-grain sample rate and then the data communication device is pinged using coarse-grain sampling over a second sampling interval 804 according to a coarse-grain sample rate.

Referring to both FIGS. 7 and 8, ML training is done over a dataset using a set of the sampling/features under the fine-grain sampling. ML inference is then performed using as the input the current sampling/features under the coarse-grain sampling. The target is for accurate sampling values in the coarse-grain sampling period. Fine-grain sampling is done for a short duration in the device and data collected thereby is used to collect other related features to complete the ML training, which can be done on a device or remote from the device. Then, coarse-grain sampling is used during the remainder of the sampling interval. Based on coarse-grain sampling and related features, the ML model is used to estimate accurate sampling values (ML inference model can be run on the device or on a remote device). Sampling over the fine-grain sampling interval is accurate and ML is not required for operation on these samples, in some embodiments.

Data Sampling is divided into the multiple stages with fine-grain sampling for a short duration (ML training) and coarse-grain sampling for a long duration (ML inference). Generally, according to the optional aspect of FIG. 7, fine-grain sampling is performed for the multiple short durations in the communications device. The fine-grain samples and other related features are collected and used to complete ML training. Then, coarse-grain sampling is performed over multiple durations using the ML model to estimate accurate sampling values (ML inference model can be run on a Device or Remote). As was previously described, the fine-grain sampling is the accurate sampling and ML inference is not used on the fine-grain samples.

Figure 9:
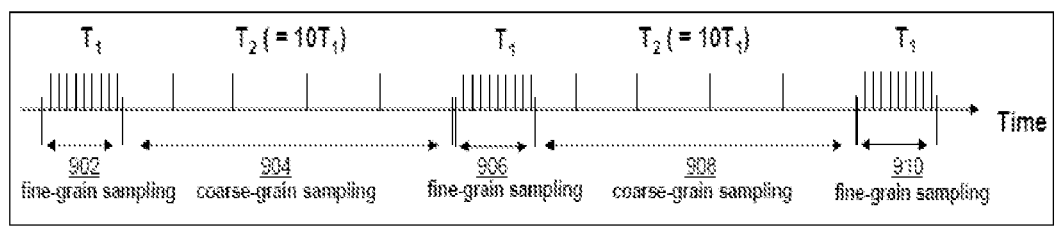
FIG. 9 is a diagram illustrating two-stage sampling and machine learning over multiple sampling stages according to an optional aspect of the present disclosure.

FIG. 9 is a diagram illustrating two-stage sampling and machine learning over multiple sampling stages according to an optional aspect of the present disclosure. According to the operations 900 of FIG. 9, sampling of an operational characteristic of a data communication device at a fine-grain sample rate is performed over a first sampling interval 902 to produce fine-grain samples of the operational characteristic of the data communication device. Then, training a machine learning algorithm using the fine-grain samples, the fine grain sample rate, and the coarse-grain sample rate and may further include the type of data being sampled and other parameters. Sampling of the operational characteristic of the data communication device is then performed at the coarse-grain sample rate over a second sampling interval 904 to produce coarse-grain samples of the operational characteristic of the data communication device. Then, ML is used to produce accuracy-enhanced results based upon the coarse-grain samples.

With the example of FIG. 9, sampling the operational characteristic of the data communication device data at the fine-grain sample rate is also done over a third sampling interval 906 to produce second fine-grain samples of the operational characteristic of the data communication device. Then, the machine learning algorithm is then retrained using the second fine-grain samples to determine an updated coarse-grain sample rate that is less than the fine-grain sample rate. Coarse-grain sampling of the operational characteristic of the data communication device is then again performed over coarse-grain sampling interval 908, which is followed by another fine-grain sampling interval 910. These operations may be repeated over time in a similar manner. With these operations, coarse-grain samples are then processed using ML to produce accuracy-enhanced samples.

Figure 10:
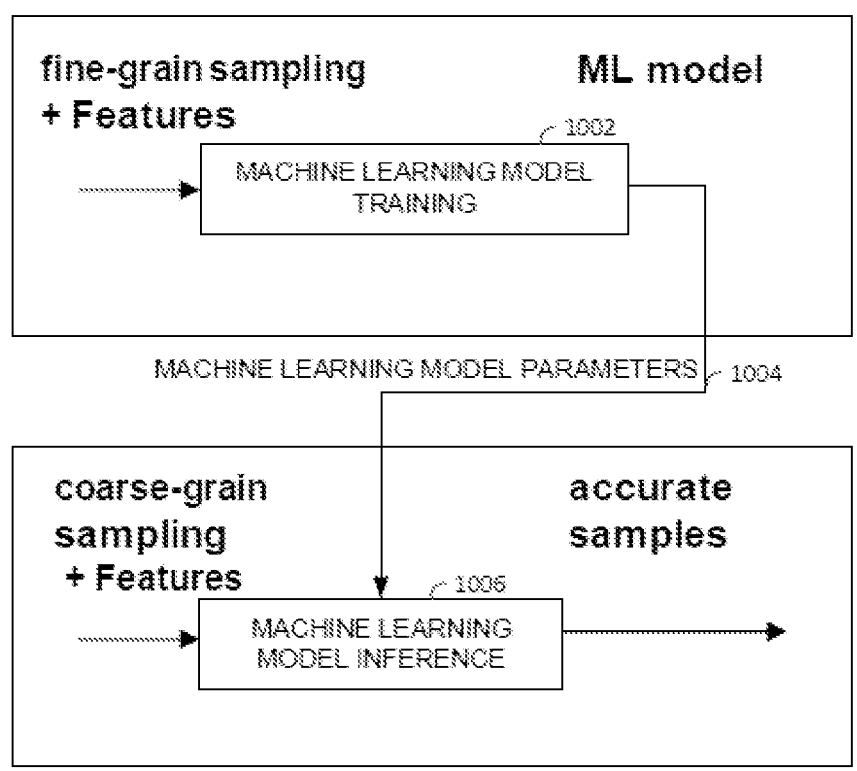
FIG. 10 is a block diagram illustrating the interaction between machine learning model training and machine learning inference according to the present disclosure.

FIG. 10 is a block diagram illustrating the interaction between machine learning model training and machine learning inference according to the present disclosure. Machine learning model training 1002 is performed using the fine-grain samples, the fine-grain sample rate, the coarse-grain sample rate, and other features of the ML model, which may include the type of data being sampled, input based upon the type of ML model employed, e.g., supervised learning, unsupervised learning, semi-supervised learning, reinforcement learning, an algorithm used, e.g., Q-Learning. Temporal Difference (TD), or Deep Adversarial Networks, for example. Other machine learning algorithms that may be employed include Linear Regression, Logistic Regression, Decision Trees, SVM, Naive Bayes, kNN, K-Means, Random Forest or Dimensionality Reduction Algorithms such as Gradient Boosting algorithms, GBM, XGBoost, LightGBM or CatBoost, for example. In one particular embodiment, the Random Forests Algorithm is used. Of course, the employed machine learning algorithms depend upon the operational characteristic of interest. For example, a first machine learning algorithm may be employed to sample health data while a differing machine learning algorithm may be selected for network traffic data.

Machine learning model parameters 1004 are then passed to a machine learning model inference 1006, which receives as inputs the coarse-grain samples and additional features to produce accurate samples that are used to closely track, such as those illustrated in FIG. 6C, which enable the production of the operational characteristic of the data communication device that accurately corresponds to the operational characteristic of the data communication device produced by the fine-grain samples.

There are three possible deployment models for the ML. With a first deployment, ML model training 1002, coarse-grain sampling, and ML inference 1006 with coarse-grain samples, are done by a single device. With a second deployment, ML model training 1002 is performed by a first device and coarse-grain sampling and ML model inference 1006 based upon the coarse-grain samples is done by a second device. With a third deployment, ML model training 1002 is done by a first device, coarse-sampling is done by a second device, and ML inference 1006 based upon coarse-grain samples is done by a third device. The features employed with both the ML training 1002 and the ML inference coarse-grain sampling will depend on particular use cases.

Figure 11:
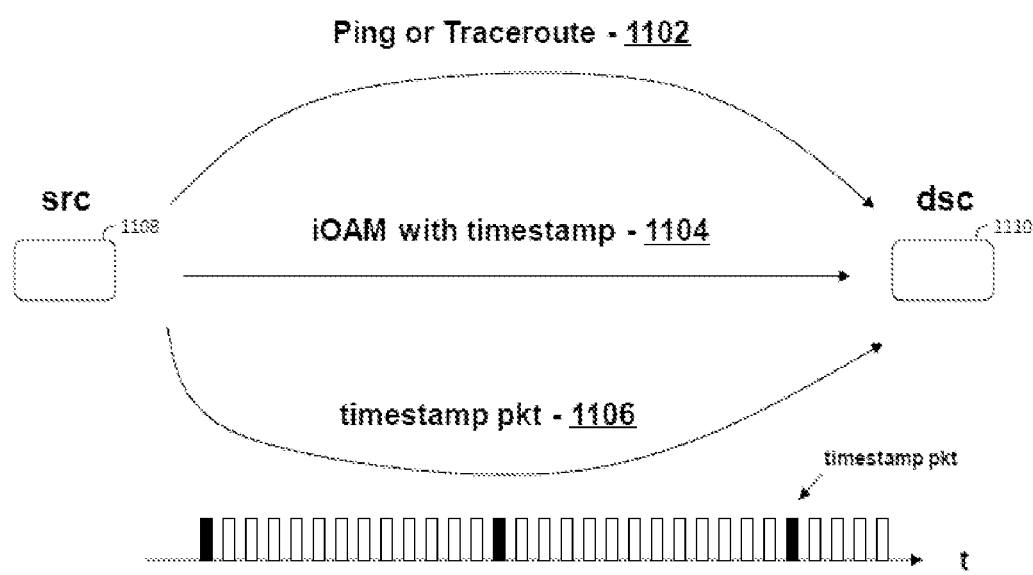
FIG. 11 is a diagram illustrating various techniques to determine real-time network state and latency information according to the present disclosure.

FIG. 11 is a diagram illustrating RTT measurements according to an optional aspect of the present disclosure. Illustrated in FIG. 11 are three possible methods for the RTT measurement. Regardless of the method, a high sampling frequency will achieve better RTT accuracy, but the resource consumption will be higher. The approach of the present disclosure is to use ML inference to reduce the sampling frequency after the ML training cycle, but still achieve or approach the accurate sampling values. In FIG. 11, SRC 1108 stands for source and DSC 1110 stands for destination.

According to a first latency measurement technique, Ping or Traceroute methods 1102 are used to collect a dataset for latency measurement. Features of this method include:

Current RTT stats (stats during one sampling period at the current time t; i.e. [t-T, t] time interval) t, curAvgRTT, curMaxRTT, curMinRTT, curDevRTT Avg. RTT stats (stats during $D_1$), mean (avgRTT), mean (maxRTT), mean (minRTT), mean (devRTT)

$T_1$, $T_2$, $D_1$, $D_2$ $T_1$: fine-grain sampling period $T_2$: coarse-grain sampling period $D_1$: total time length of fine-grain sampling (until now)

$D_2$: total time length of coarse-grain sampling (until now)

According to a second technique, in-situ Operations, Administration and Maintenance (iOAM) with timestamp 1104 is used. iOAM provides real-time telemetry of individual data packets and flows. It is based on telemetry information which is embedded along within data packets.

According to a third technique, packet timestamps 1106 are used for measuring latency.

ML training may be done upon the fine-grain sampled data using a data set having sampling/features, including:

{$T_2$, curAvgRTT, curMaxRTT, curMinRTT, curDevRTT, $meanT_2$ (avgRTT), $meanT_2$ (maxRTT), $meanT_2$ (minRTT), $meanT_2$ (devRTT), $T_1$. $T_2$. $D_1$};

{$2T_2$, curAvgRTT, curMaxRTT, curMinRTT, curDevRTT, $mean2T_2$ (avgRTT), $mean2T_2$ (maxRTT), $mean2T_2$ (minRTT), $mean2T_2$ (devRTT), $D_1$}; and {$3T_2$, curAvgRTT, curMaxRTT, curMinRTT, curDevRTT, $mean3T_2$ (avgRTT), $mean3T_2$ (maxRTT), $mean3T_2$ (minRTT), $mean3T_2$ (devRTT), $D_1$}

The inference inputs and targets are as follows:

The inference inputs are the sampling/features under the coarse-grain sampling at the time t, using {t, curAvgRTT, curMaxRTT, curMinRTT, curDevRTT, meant (avgRTT), meant (maxRTT), meant (minRTT), meant (devRTT), $T_1$, $T_2$, $D_1$}.

The ML Target is the accurate avgRTT value during the current sampling period $T_2$: [$t-T_2$, t].

While several embodiments have been provided in the present disclosure, it may be understood that the disclosed systems and methods might be embodied in many other specific forms without departing from the spirit or scope of the present disclosure. The present examples are to be considered as illustrative and not restrictive, and the disclosure is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for monitoring an operational characteristic of a data communication device within a network, the method comprising:

obtaining first fine-grain samples of the operational characteristic of the data communication device, wherein the first fine-grain samples are produced by sampling the operational characteristic of the data communication device at a fine-grain sample rate over a first sampling interval;

training a machine learning algorithm using the first fine-grain samples, the fine-grain sample rate, and a coarse-grain sample rate that is less than the fine-grain sample rate;

obtaining coarse-grain samples of the operational characteristic of the data communication device, wherein the coarse-grain samples are produced by sampling the operational characteristic of the data communication device at the coarse-grain sample rate over a second sampling interval; and using the machine learning algorithm to process the coarse-grain samples to produce accuracy-enhanced samples of the operational characteristic of the data communication device.

2. The method of claim 1, wherein the operational characteristic of the data communication device includes a round-trip communication interval between a data collection communication device and the data communication device.

3. The method of claim 1, wherein the operational characteristic of the data communication device includes an average free buffer level of the data communication device.

4. The method of claim 1, wherein the operational characteristic of the data communication device includes at least one health related parameter.

5. The method of claim 1, wherein the operational characteristic of the data communication device includes at least one network state parameter.

6. The method of claim 1, wherein the operational characteristic of the data communication device includes at least one network latency parameter.

7. The method of claim 1, further comprising:

obtaining second fine-grain samples of the operational characteristic of the data communication device, wherein the second fine-grain samples are produced by sampling the operational characteristic of the data communication device at the fine-grain sample rate over a third sampling interval; and retraining the machine learning algorithm using the second fine-grain samples of the operational characteristic of the data communication device.

8. A communication device comprising:

a processing circuitry;

a memory; and a communications circuitry coupled to the processing circuitry and the memory, the communications circuitry configured to:

obtain first fine-grain samples of an operational characteristic of a data communication device, wherein the first fine-grain samples are produced by sampling the operational characteristic of the data communication device at a fine-grain sample rate over a first sampling interval;

train a machine learning algorithm using the first fine-grain samples, the fine-grain sample rate, and a coarse-grain sample rate that is less than the fine-grain sample rate;

obtain coarse-grain samples of the operational characteristic of the data communication device, wherein the coarse-grain samples are produced by sampling the operational characteristic of the data communication device at the coarse-grain sample rate over a second sampling interval; and use the machine learning algorithm to process the coarse-grain samples to produce accuracy-enhanced samples of the operational characteristic of the data communication device.

9. The communication device of claim 8, wherein the operational characteristic of the data communication device includes a round-trip communication interval between a data collection communication device and the data communication device.

10. The communication device of claim 8, wherein the operational characteristic of the data communication device includes an average free buffer level of the data communication device.

11. The communication device of claim 8, wherein the operational characteristic of the data communication device includes at least one health related parameter.

12. The communication device of claim 8, wherein the operational characteristic of the data communication device includes at least one network state parameter.

13. The communication device of claim 8, wherein the operational characteristic of the data communication device includes at least one network latency parameter.

14. The communication device of claim 8, wherein the communications circuitry is further configured to:
    obtain second fine-grain samples of the operational characteristic of the data communication device, wherein the second fine-grain samples are produced by sampling the operational characteristic of the data communication device at the fine-grain sample rate over a third sampling interval; and
    retrain the machine learning algorithm using the second fine-grain samples of the operational characteristic of the data communication device.

15. A computer program product comprising computer-executable instructions that are stored on a non-transitory computer storage medium and that, when executed by one or more processors, cause a communication device to:
    obtain first fine-grain samples of an operational characteristic of a data communication device, wherein the first fine-grain samples are produced by sampling the operational characteristic of the data communication device at a fine-grain sample rate over a first sampling interval;
    train a machine learning algorithm using the first fine-grain samples, the fine-grain sample rate, and a coarse-grain sample rate that is less than the fine-grain sample rate;
    obtain coarse-grain samples of the operational characteristic of the data communication device, wherein the coarse-grain samples are produced by sampling the operational characteristic of the data communication device at the coarse-grain sample rate over a second sampling interval; and
    use the machine learning algorithm to process the coarse-grain samples to produce accuracy-enhanced samples of the operational characteristic of the data communication device.

16. The computer program product of claim 15, wherein the operational characteristic of the data communication device includes at least one of:
    a round-trip communication interval between a data collection communication device and the data communication device; or
    an average free buffer level of the data communication device.

17. The computer program product of claim 15, wherein the operational characteristic of the data communication device includes at least one health related parameter.

18. The computer program product of claim 15, wherein the operational characteristic of the data communication device includes at least one network state parameter.

19. The computer program product of claim 15, wherein the operational characteristic of the data communication device includes at least one network latency parameter.

20. The computer program product of claim 15, wherein the computer-executable instructions, when executed by the one or more processors, cause the communication device to:
    obtain second fine-grain samples of the operational characteristic of the data communication device, wherein the second fine-grain samples are produced by sampling the operational characteristic of the data communication device at the fine-grain sample rate over a third sampling interval; and
    retrain the machine learning algorithm using the second fine-grain samples of the operational characteristic of the data communication device.

* * * * *

UNITED STATES PATENT AND TRADEMARK OFFICE
CERTIFICATE OF CORRECTION

PATENT NO. : 12,184,467 B2  
APPLICATION NO. : 18/351244  
DATED : December 31, 2024  
INVENTOR(S) : Ming Li et al.

Page 1 of 1

It is certified that error appears in the above-identified patent and that said Letters Patent is hereby corrected as shown below:

On the Title Page

Item (71) Applicant: Delete "Huawei Technologies Co., Ltd., Guangdong (CN)" and insert -- Huawei Technologies Co., Ltd., Shenzhen (CN) --.

Signed and Sealed this  
Eighteenth Day of February, 2025

Coke Morgan Stewart  
*Acting Director of the United States Patent and Trademark Office*